E. L. MINNIG.
NUT LOCK.
APPLICATION FILED NOV. 16, 1911.
1,024,805.
Patented Apr. 30, 1912.
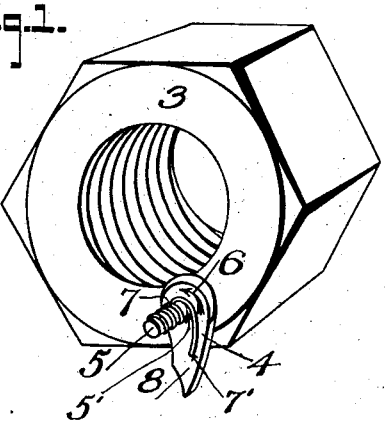
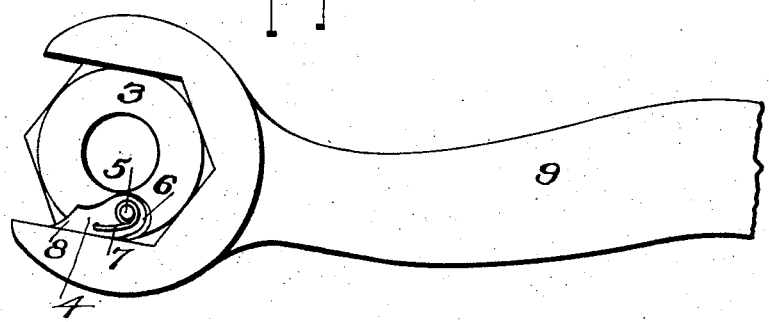
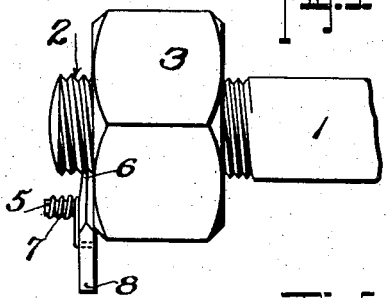
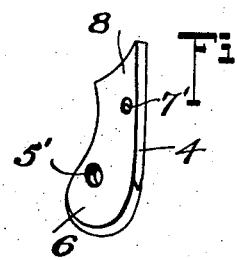
Witnesses
C. H. Wagner
H. C. Robb
Inventor
Elmer L. Minnig.
By Beelart Robb
J. J. Robb
Attorneys.

ure will be apparent, for when the said cam is in engagement with the threads of the bolt 1, any unauthorized off-turning or unscrewing of the nut 3 will tend to draw the member 4 in the direction of the arrow in Fig. 1, the longitudinal incline of said cam portion constituting a wedge to prevent such movement. In addition to the foregoing, the particular construction of the member 4 permits it to be used in connection with bolts of varying sized threads where the dual function thereof, that of tendency by transverse engagement with the threads to resist unscrewing action and that of forming a wedge between the threads themselves and thereby doubly insuring immediate operation of the pawl 4, will be equally subserved.

UNITED STATES PATENT OFFICE.

ELMER L. MINNIG, OF HARRISBURG, PENNSYLVANIA.

NUT-LOCK.

1,024,805.

Specification of Letters Patent. Patented Apr. 30, 1912.

Application filed November 16, 1911. Serial No. 660,715.

*To all whom it may concern:*

Be it known that I, ELMER L. MINNIG, a citizen of the United States, residing at Harrisburg, in the county of Dauphin and State of Pennsylvania, have invented certain new and useful Improvements in Nut-Locks, of which the following is a specification.

This invention relates to improvements in nut locks, its primary object being to provide means coöperating with the holding nut which will automatically engage with the threads of a bolt to bind said nut in position, any unauthorized off-turning of the nut tending to increase the binding action aforesaid.

Specifically, my invention comprises a peculiar form of locking means designed particularly with a view to afford increased wedging action when adjusted in its operative position between said locking means and the threads of the bolt to which the nut may be applied, the advantages of the construction and arrangement of the parts being hereinafter more fully described, claimed and illustrated in the drawings, wherein:—

Figure 1 is a perspective view of the holding nut with my invention applied thereto; Fig. 2 is a top plan view of the nut showing the manner of releasing the locking member by a wrench applied thereto; Fig. 3 is a side elevation of my invention applied to a bolt; and Fig. 4 is a detail view of the locking member. Fig. 5 is an enlarged end view of the locking pawl alone, showing more clearly the beveled cam portion of the same.

Referring now to the drawings, 1 designates a bolt having a threaded end 2, upon which is adapted to be screwed the holding nut 3.

4 designates the pawl which, for the purpose of description, I will call a locking member, and which is eccentrically mounted on a pin 5 projecting from the upper face or side of the nut 3 and passing through an aperture 5' in the said locking member. The member 4 is peculiarly shaped and its inner end forms a thread engaging cam 6 having its edge beveled transversely on opposite sides thereof and longitudinally inclined with respect to the threads of the bolt, as clearly shown in Fig. 5 of the drawings. The action and advantages of this feature will be apparent, for when the said cam is in engagement with the threads of the bolt 1, any unauthorized off-turning or unscrewing of the nut 3 will tend to draw the member 4 in the direction of the arrow in Fig. 1, the longitudinal incline of said cam portion constituting a wedge to prevent such movement. In addition to the foregoing, the particular construction of the member 4 permits it to be used in connection with bolts of varying sized threads where the dual function thereof, that of tendency by transverse engagement with the threads to resist unscrewing action and that of forming a wedge between the threads themselves and thereby doubly insuring immediate operation of the pawl 4, will be equally subserved.

Mounted on the pin 5 is a spiral spring 7, the upper extremity of which is secured to the pin and the lower end being received by an aperture 7 in the locking member 4. The tendency of this spring is to hold the locking member 7 in normal operative position, automatically engaging with the threads of the bolt 1 as the nut 3 is screwed thereon.

The outer end portion of the locking member 4 constitutes a projection 8 extending over the edge of the nut 3 for ready engagement by a wrench 9 when it is desired to release and remove the nut. The action of releasing the locking member and removing the nut may be simultaneous, as will be apparent from the foregoing. In placing the nut in position on the bolt 1, the locking member will be in operative position and the binding action may be assisted by tapping the outer projection 8 to prevent any loosening of the nut 3 from the bolt.

Having thus fully described the invention, what is claimed as new is:—

1. In a nut lock, the combination of a threaded bolt, a nut adapted to be screwed thereon, and a locking member mounted on said nut comprising a cam having a thread engaging portion transversely beveled and longitudinally inclined with respect to the threads of the bolt.

2. In a nut lock, the combination of a threaded bolt, a nut adapted to be screwed thereon, a pin projecting from the said nut, a pawl eccentrically mounted on the pin, the inner end of said pawl comprising a wedge-shaped thread engaging cam, said cam being transversely beveled from opposite sides thereof whereby unauthorized unscrewing of the nut tends to wedge said cam into the threads, the outer end of the pawl constituting a projection for engagement with a wrench to release said pawl, and a spring mounted on the pin aforesaid and secured to the pawl to hold the same in normal operative position.

In testimony whereof I affix my signature in presence of two witnesses.

ELMER L. MINNIG.

Witnesses:
JOHN B. WELSH,
Mrs. C. F. HOLTZMAN.

Copies of this patent may be obtained for five cents each, by addressing the "Commissioner of Patents, Washington, D. C."